Feb. 27, 1934.　　　　G. P. BOARDMAN　　　　1,949,004
BREEDING JACKET
Original Filed March 31, 1931　　2 Sheets-Sheet 1
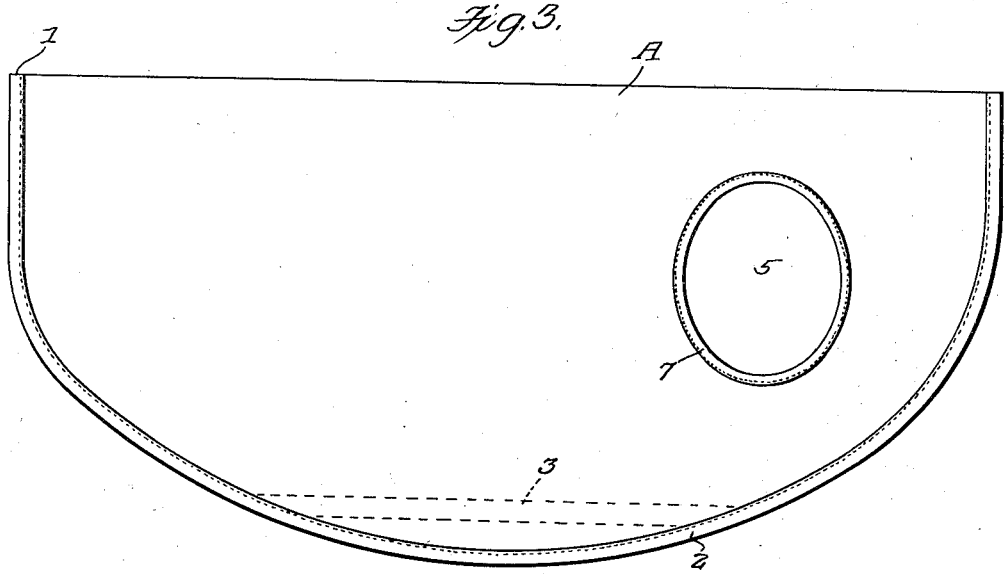
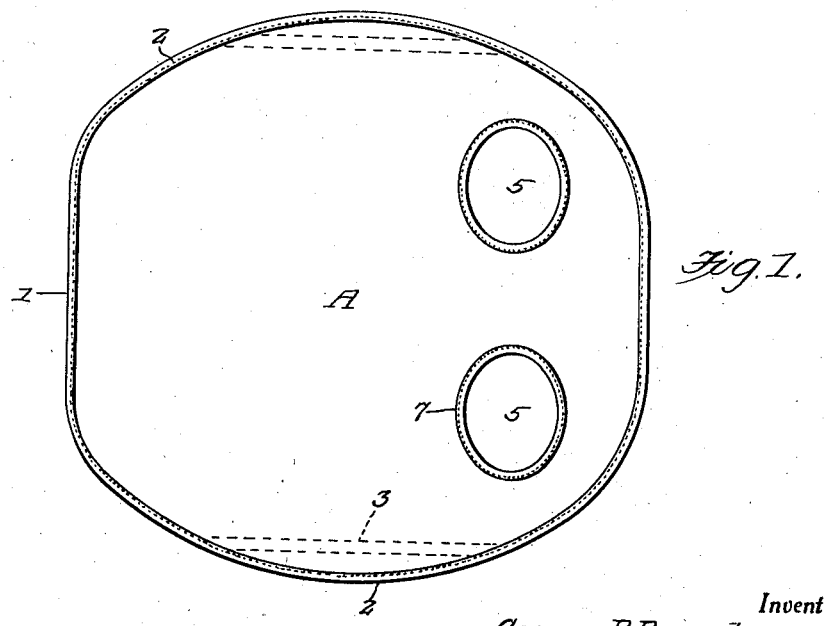
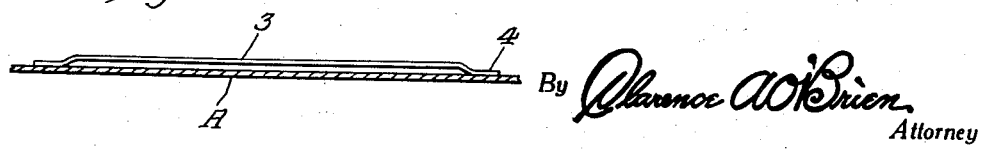
Inventor
George P. Boardman,
By Clarence A. O'Brien
Attorney Feb. 27, 1934.   G. P. BOARDMAN   1,949,004
BREEDING JACKET
Original Filed March 31, 1931   2 Sheets-Sheet 2
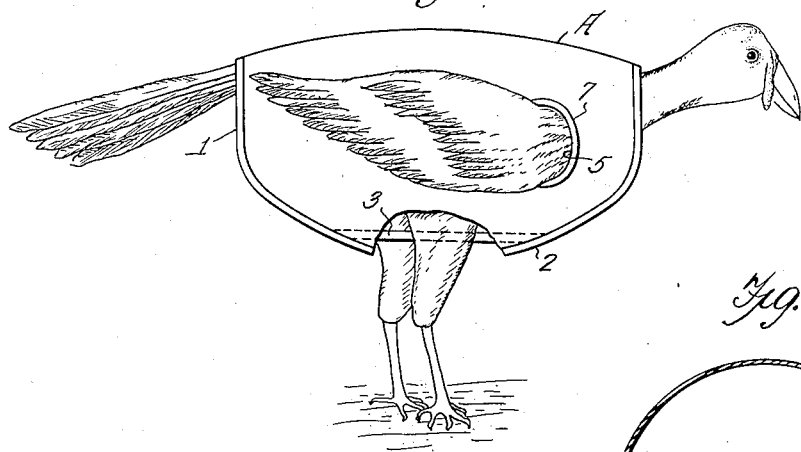
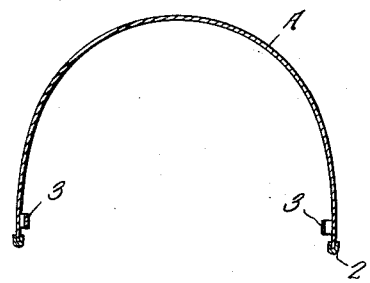
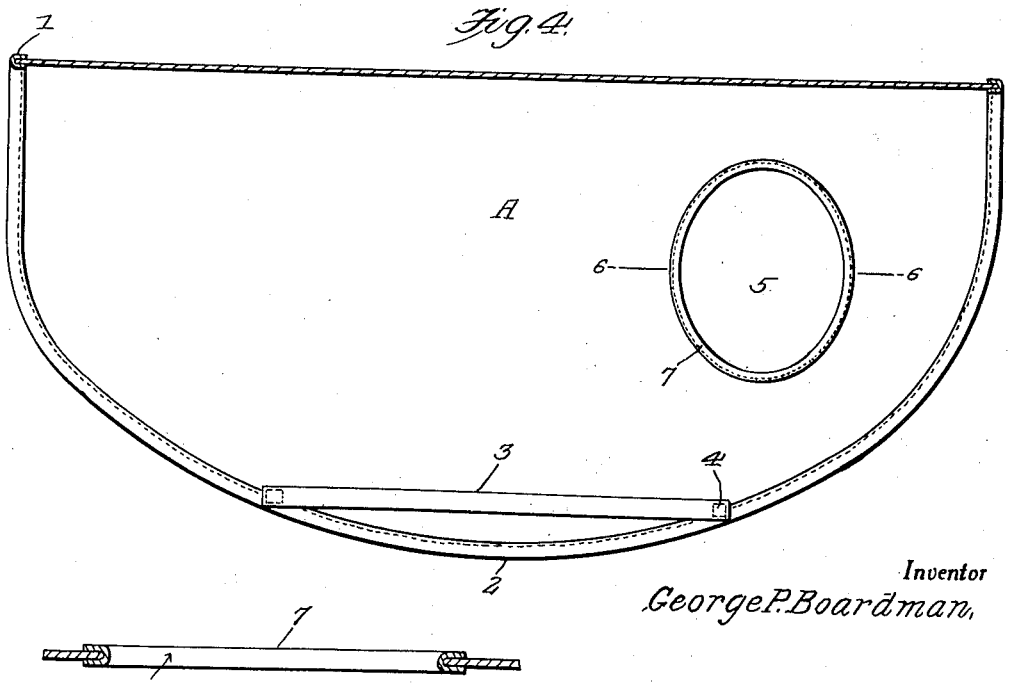
Inventor
George P. Boardman,
By Clarence A. O'Brien
Attorney Patented Feb. 27, 1934

1,949,004

UNITED STATES PATENT OFFICE 1,949,004

BREEDING JACKET

George P. Boardman, Fillmore, Calif.

Application March 31, 1931, Serial No. 526,747
Renewed October 10, 1933

1 Claim. (Cl. 119—143)

This invention relates to a breeding jacket mainly designed for turkeys, the general object of the invention being to provide a jacket adapted to be placed on the female during the breeding season for preventing injury to the female by the males.

Figure 1 is a top plan view of the device.

Figure 2 is a transverse sectional view through the same and showing the same in a position the device will occupy when in use.

Figure 3 is an enlarged view of one-half of the device.

Figure 4 is a similar view but showing the other side of the device.

Figure 5 is a sectional view taken adjacent one of the longitudinal straps.

Figure 6 is a section on line 6—6 of Figure 4.

Fig. 7 is a view showing the device on a turkey.

As shown in these views, the device A is preferably formed of canvas is of substantially circular form but with two of its opposed sides straight, as shown at 1 and the rounded sides 2 have strips 3 of elastic sewn to their under faces at the ends of the strips as shown at 4 and a pair of openings 5 is formed in the front part of the device. The walls of the opening and the edges of the device itself are covered by binding strips 7. This device is adapted to be placed on the hens with the wings thereof passing through the holes 5 and the straps 3 passing under the legs so that the device acts as a jacket covering the upper portion of the fowl, and thus the device will prevent injury to the female from the feet of the male.

As shown, the straight sides 1 constitute the front and rear portions of the jacket.

I claim:

A breeding jacket for turkeys and the like comprising a body formed of canvas or the like having rounded side portions and straight front and rear portions, and having a pair of openings in the front part thereof, one adjacent each side, for receiving the wings of the turkey, a strap connected to each side on the rear face of the body and extending around the legs of the turkey, said strap being slightly spaced from the central portion of the rounded side and binding strips extending around the body and around the walls of the openings.

GEORGE P. BOARDMAN.